(12) United States Patent
Hwang et al.

(10) Patent No.: US 8,605,294 B2
(45) Date of Patent: Dec. 10, 2013

(54) ACTUATING APPARATUS, ACTUATING SYSTEM AND METHOD FOR ACTUATING A WORKING STAGE TO MOVE RELATIVE TO A PLATFORM WITH HIGH-PRECISION POSITIONING CAPABILITY

(75) Inventors: Yi-Yuh Hwang, Taoyuan County (TW); Chin-Der Hwang, Hsinchu County (TW); Chih-Ming Liao, Taoyuan County (TW); Ting-Wei Chiang, New Taipei (TW); Wei-Guo Chang, Taoyuan County (TW); Wen-Cheng Huang, Taipei (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 138 days.

(21) Appl. No.: 13/416,229

(22) Filed: Mar. 9, 2012

(65) Prior Publication Data

US 2013/0235389 A1 Sep. 12, 2013

(51) Int. Cl.
 *G01B 11/14* (2006.01)
(52) U.S. Cl.
 USPC .......................................... 356/614; 356/620
(58) Field of Classification Search
 USPC ......................................... 356/614, 616, 620
 See application file for complete search history.

(56) References Cited

U.S. PATENT DOCUMENTS

| | | | | |
|---|---|---|---|---|
| 4,590,380 A * | 5/1986 | Tamaki | ................. | 250/442.11 |
| 4,607,166 A * | 8/1986 | Tamaki | ................. | 250/442.11 |
| 4,676,649 A * | 6/1987 | Phillips | ................. | 356/401 |
| 5,062,712 A * | 11/1991 | Sakuta et al. | ................. | 356/400 |
| 6,649,923 B2 * | 11/2003 | Matsumoto | ................. | 250/548 |
| 2008/0151257 A1 * | 6/2008 | Yasuda et al. | ................. | 356/498 |
| 2009/0213357 A1 * | 8/2009 | Arai | ................. | 355/72 |
| 2013/0076892 A1 * | 3/2013 | Nahum et al. | ................. | 348/135 |

* cited by examiner

*Primary Examiner* — Roy M Punnoose
(74) *Attorney, Agent, or Firm* — Jackson IPG PLLC

(57) ABSTRACT

An actuating apparatus includes a motion driving module rigidly coupled to a platform, a working stage driven by the motion driving module to move relative to the platform, a speckle image capturing module rigidly coupled to the working stage and capable of capturing a speckle image of a sub-region of a reference region of the platform, and a control module operable in a positioning mode, where the control module obtains a current position of the working stage in a coordinate system associated with the platform based on a comparison between the captured speckle image and reference speckle image information that is associated with and unique to the reference region, and controls the motion driving module to drive the working stage toward a target position in the coordinate system based on a difference between the current position and the target position.

20 Claims, 9 Drawing Sheets

US 8,605,294 B2

ACTUATING APPARATUS, ACTUATING SYSTEM AND METHOD FOR ACTUATING A WORKING STAGE TO MOVE RELATIVE TO A PLATFORM WITH HIGH-PRECISION POSITIONING CAPABILITY

BACKGROUND OF THE INVENTION

1. Field of the Invention

The present invention relates to high-precision positioning, more particularly to an actuating apparatus, an actuating system and a method for actuating a working stage to move relative to a platform and capable of high-precision positioning.

2. Description of the Related Art

Linear scales are commonly employed in high-precision measurements of relative positions (relative displacements). Further, the utilization of computer numerical control provides compensation for errors in the measurements that arise from such as backlash of ball screw shafts and servo motors, and hysteresis of piezoelectric actuators. These errors are generally recorded in tables for later reference in corrections of the measured relative positions.

However, linear scales are inherently characterized by cumulative errors associated with the manufacturing process thereof, and typically have an accuracy of $\pm(3+L/0.2)\mu m$, where L is length in meters. In other words, linear scales are not suitable for use in machining of products of large dimensions (e.g., wind turbine blades of large wind power generators). Moreover, since the relative positions are consecutively measured with linear scales, the errors associated therewith are also cumulative.

Therefore, how to provide a metrological technique/tool that is capable of absolute positioning and that is suitable for use in machining of products of large dimensions has been a subject of interest in the industry.

SUMMARY OF THE INVENTION

Therefore, an object of the present invention is to provide an actuating apparatus, an actuating system, and a method for actuating a working stage to move relative to a platform and capable of high-precision positioning.

According to one aspect of the present invention, there is provided an actuating apparatus that includes a motion driving module, a working stage, a speckle image capturing module and a control module. The motion driving module is to be rigidly coupled to a platform having a reference region that has speckle features and that is associated with a coordinate system. The working stage is coupled to and driven by the motion driving module to move relative to the platform. The speckle image capturing module is rigidly coupled to the working stage so as to be movable relative to the platform along with the working stage, and is capable of capturing a speckle image of a sub-region of the reference region. The control module is operatively associated with the motion driving module and the speckle image capturing module, and is operable in a positioning mode, where the control module obtains a current position of the working stage in the coordinate system based on a comparison between the speckle image captured by the speckle image capturing module and reference speckle image information that is associated with and unique to the reference region of the platform, and controls the motion driving module to drive the working stage toward a target position in the coordinate system based on a difference between the current position of the working stage and the target position.

According to another aspect of the present invention, there is provided an actuating system that includes a platform having a reference region that has speckle features and that is associated with a coordinate system, and the abovementioned actuating apparatus.

According to yet another aspect of the present invention, there is provided a method for actuating a working stage to move relative to a platform. The working stage is coupled to and driven by a motion driving module which is rigidly coupled to the platform. The platform has a reference region that has speckle features and that is associated with a coordinate system. The method includes the steps of:

configuring a speckle image capturing module rigidly coupled to the working stage to capture a speckle image of a sub-region of the reference region;

comparing the speckle image thus captured with reference speckle image information that is associated with and unique to the reference region of the platform;

obtaining a current position of the working stage in the coordinate system based on a result of the comparison; and controlling the motion driving module to drive the working stage toward a target position in the coordinate system based on a difference between the current position of the working stage and the target position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
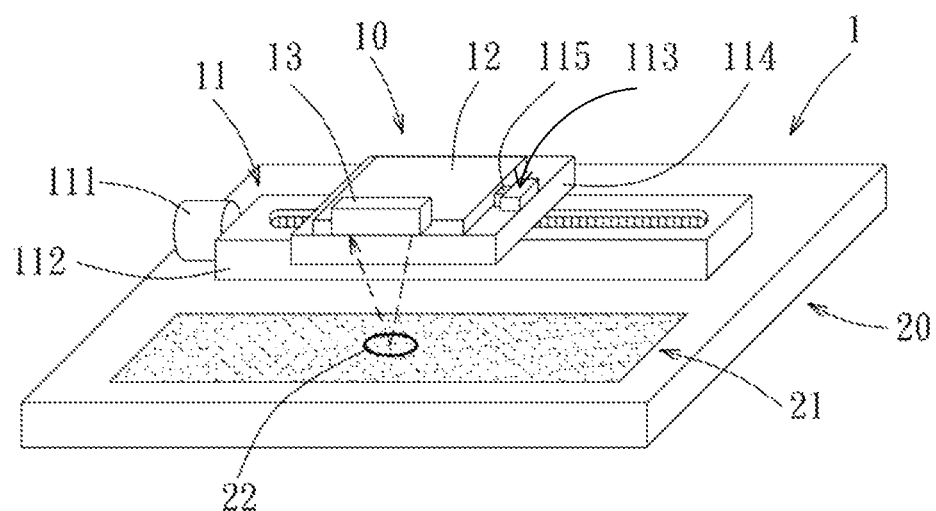
FIG. 1 is a perspective view of a first preferred embodiment of an actuating system according to the present invention.

Before the present invention is described in greater detail, it should be noted that like elements are denoted by the same reference numerals throughout the disclosure.

Figure 2:
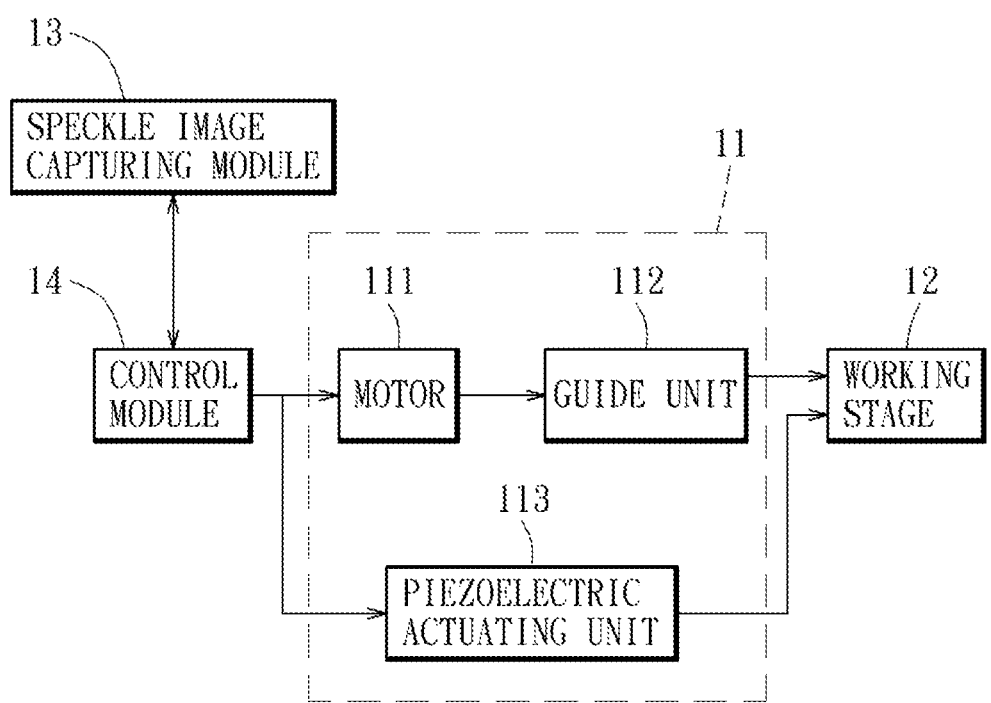
FIG. 2 is a block diagram illustrating operative relationships among components of the actuating system.

Referring to FIGS. 1 and 2, the first preferred embodiment of an actuating system 1 according to the present invention includes an actuating apparatus 10 and a platform 20 that has a reference region 21 with speckle features. The actuating apparatus 10 includes a motion driving module 11 rigidly coupled to the platform 20, a working stage 12 coupled to and driven by the motion driving module 11 to move relative to the platform 20, a speckle image capturing module 13 rigidly coupled to the working stage 12 so as to be movable relative to the platform 20 along with the working stage 12, and a control module 14 operatively associated with the motion driving module 11 and the speckle image capturing module 13. In this embodiment, the speckle image capturing module 13 and the control module 14 are configured to communicate with each other over a wired or wireless connection.

Figure 8:
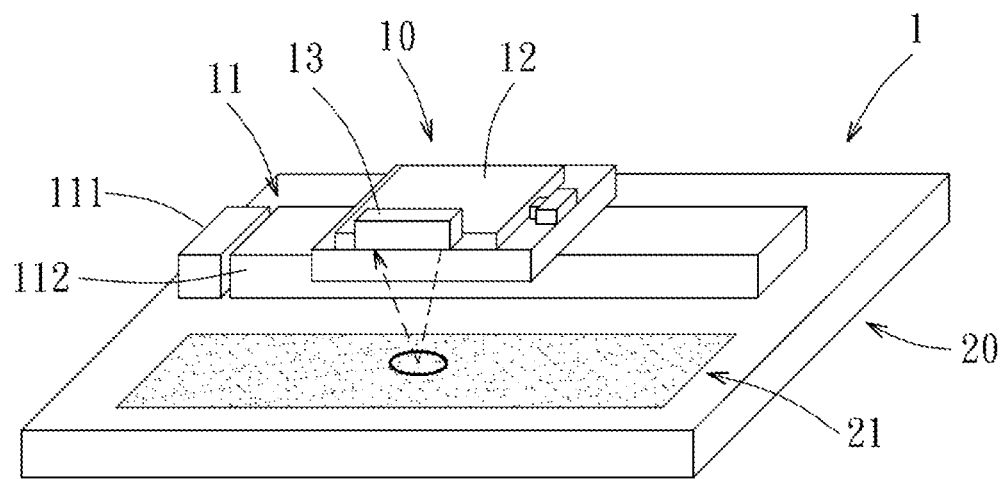
FIG. 8 is a perspective view illustrating an example in which a motion driving module includes a linear motor and a linear slide rail.

The motion driving module 11 includes a motor 111, and a guide unit 112 that is rigidly coupled to the platform 20, that has the working stage 12 disposed movably thereon, and that is operatively associated with the motor 111 so as to drive the working stage 12 to move relative to the platform 20. In this embodiment, the motor 111 is a stepper motor or a servo motor, and the guide unit 112 includes a ball screw shaft that is coupled to the working stage 12 and that is driven by the motor 111 so as to drive the working stage 12 to move relative to the platform 20 along a direction parallel to the ball screw shaft. In particular, in a case where the working stage 12 requires extreme stability, it is preferable for the motor 111 to be a stepper motor since no excitation current passes through the stepper motor after each step, such that after the working stage 12 is moved by the stepper motor to a desired position, the working stage 12 will remain in a steady state and will not have slight movements as with other types of motors through which excitation current is constantly supplied. It should be noted that, in other embodiments, the motor 111 of the motion driving module 11 may be a linear motor, and correspondingly the guide unit 112 of the motion driving module 11 is a linear slide rail (as shown in FIG. 8).

In this embodiment, the motion driving module 11 further includes a piezoelectric actuating unit 113 mounted on the guide unit 112. The piezoelectric actuating unit 113 includes a base 114 that is mounted on the guide unit 112 and that is movable relative to the platform 20, and a piezoelectric element 115 that is mounted on the base 114 and that is operatively associated with the control module 14. The working stage 12 is disposed on the base 114 and is coupled to and driven by the piezoelectric element 115 to move relative to the base 114. By use of the piezoelectric actuating unit 113, it is possible to drive the working stage 12 to move in a range of smaller than tens of micrometer with relatively high precision (i.e., with displacements of smaller than tens of nanometer). Such kind of system is suitable for short-range applications.

Figure 9:
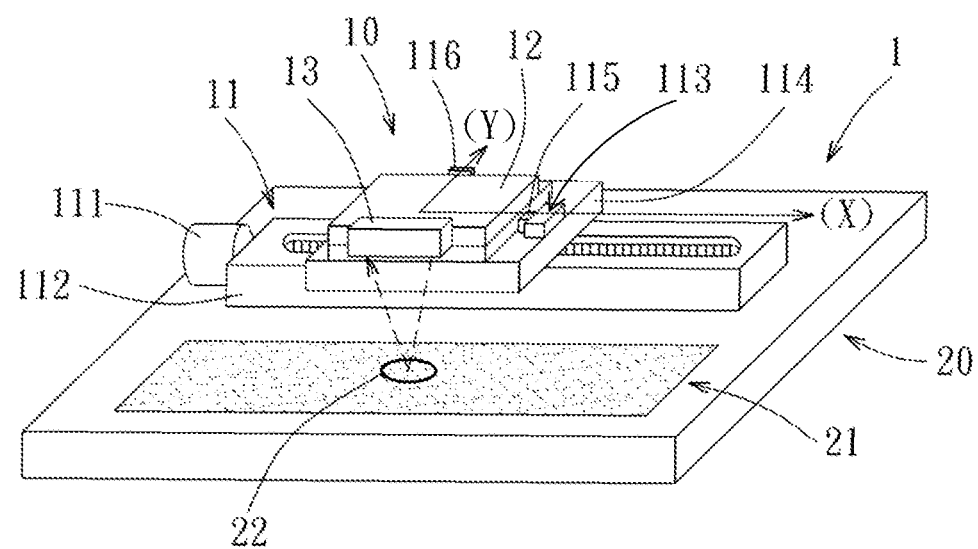
FIG. 9 is a perspective view illustrating an example in which the motion driving module includes a pair of piezoelectric elements.

It is noted that the actuating system 1 is illustrated as a one-dimensional system herein. Due to mechanical abrasion between the guide unit 112 and the base 114, manufacturing tolerance of the guide unit 112, etc., the working stage 12 may have undesirable displacements relative to the platform 20 in a second dimension. Accordingly, as shown in FIG. 9, while the base 114 of the piezoelectric actuating unit 113 is movable on the guide unit 112 in a first direction (X) to enable one-dimensional movement of the working stage 12 relative to the platform 20, and the piezoelectric element 115 is provided to fine-tune the position of the working stage 12 relative to the platform 20 in the first direction (X), the piezoelectric actuating unit 113 may further include another piezoelectric element 116 mounted to the base 114, operatively associated with the control module 14, and coupled to the working stage 12 so as to fine-tune the position of the working stage 12 relative to the platform 20 in a second direction (Y) perpendicular to the first direction (X), so that the undesirable displacements of the working stage 12 in the second direction (Y) may be compensated.

It should be noted that although the actuating system 1 is illustrated to be a one-dimensional system herein, the present invention also encompasses two-dimensional actuating systems, where the piezoelectric actuating unit 113 would include two of the piezoelectric elements 115 which are arranged on the base 114 in a manner so as to drive two-dimensional movement of the working stage 12 relative to the base 114. Since the variations necessary to implement a two-dimensional actuating system is easily conceived by one of ordinary skill in the art, further details are omitted herein. The speckle image capturing module 13 includes, for example, an optical sensor consisting of a two-dimensional array of pixels (e.g., Sony XCL 5005 CCD), and is capable of capturing an invariant speckle image of a sub-region 22 of the reference region 21 of the platform 20 having a corresponding relationship with a current position of the working stage 12 in a coordinate system that is associated with the reference region 21. For example, an image invariant optical speckle capturing device and method recited in U.S. Pat. No. 7,715,016 can be applied to the speckle image capturing module 13 for capturing the invariant speckle image, and the speckle image capturing module 13 can be configured according to the following equation described in U.S. Pat. No. 7,593,113 for the purpose of high-precision positioning of the working stage 12.

$$2\delta = 2.44 \times \lambda \times L \div D$$

In the above equation, $2\delta$ is an average diameter of light speckles, $\lambda$ is a wavelength of a highly coherent light (e.g., a laser light) used for capturing the speckle image, L is a distance between the optical sensor and an aperture of the speckle image capturing module 13, and D is a diameter of a diaphragm of the speckle image capturing module 13. In particular, the speckle image capturing module 13 is designed to capture light speckles, the diameter ($2\delta$) of which is slightly greater than a dimension of each pixel of the optical sensor. Thus, displacement of a light speckle in speckle images taken at slightly different positions of the reference region 21 may be recognized such that position of the working stage 12 relative to the platform 20 can be precisely acquired. As a result, by virtue of the configuration of the speckle image capturing module 13, the actuating system 1 is capable of positioning the working stage 12 with a precision of as high as 1% of the dimension of each pixel of the optical sensor, which generally ranges from 1 μm to 2 μm. In other words, the working stage 12 is positioned with a precision of 10 nm to 20 nm.

The platform 20 is made of an anti-abrasion and anti-deformation material that has relatively high rigidity, that has sufficient speckle features at the reference region 21 after lathing or milling process, and that is selected from the group consisting of marble, metal (such as invar steel) and combinations thereof. Generally, the platform 20 is made of metal, and the reference region 21 is an area of a top surface of the platform 20 that has three-dimensional natural texture serving to provide the speckle features. Since metal has a relatively large thermal expansion coefficient, the actuating system 1 is preferably operated in a thermostatically controlled environment to prevent thermal deformation of the platform 20 and to maintain invariance of the speckle image of the same sub-region 22 on the top surface of the platform 20 as obtained using the speckle image capturing module 13, i.e., to enable the speckle image capturing module 13 to capture invariant speckle images of the same sub-region 22 at different times. Moreover, since the three-dimensional natural texture of the area of the top surface of the platform 20 serves to provide the speckle features of the reference region 21, the two-dimensional speckle image of the sub-region 22 obtained by the speckle image capturing module 13 will have relatively high resolution. The unvarying and high-resolution characteristics of the speckle image captured by the present invention combine to facilitate high-precision positioning of the working stage 12 relative to the platform 20.

Figure 3:
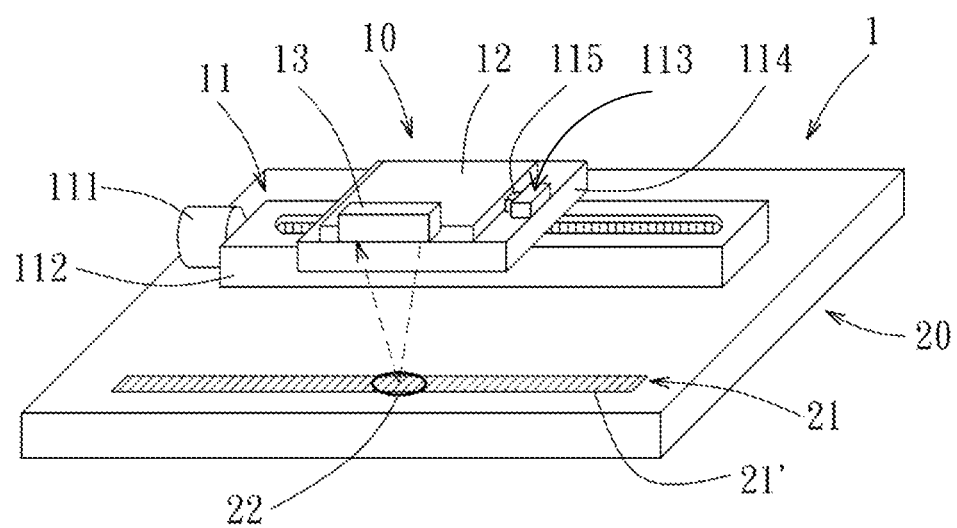
FIG. 3 is a perspective view illustrating an example in which a platform of the actuating system has a strip with speckle features attached thereon.

However, when operating outside a thermostatically controlled environment, the platform 20, which is generally made of metal having a relatively great thermal expansion coefficient (e.g., steel), may have thermal deformation attributed to variations in ambient temperature. In this case, the three-dimensional natural texture of the area of the top surface of the platform 20 serving to provide the speckle features may change due to thermal expansion/contraction such that the speckle image of the same sub-region 22 on the top surface of the platform 20 may be variant. Therefore, a strip 21', which is made from a material having a relatively low thermal expansion coefficient and which has sufficient speckle features, may be attached to the top surface of the platform 20 to serve as the reference region 21 as shown in FIG. 3. The strip 21' is preferably made of an anti-abrasion and anti-deformation material with a relatively low thermal expansion coefficient, such as zero-expansion glass.

The control module 14 is coupled to and operatively associated with the motion driving module 11 and the speckle image capturing module 13 to implement a method for actuating the working stage 12 to move relative to the platform 20. In the method for actuating the working stage 12 to move relative to the platform 20, the control module 14 is operable in a reference establishing mode for establishing reference speckle image information that is associated with and unique to the reference region 21 of the platform 20, and in a positioning mode, after completion of the reference establishing mode, for positioning the working stage 12.

Figure 4:
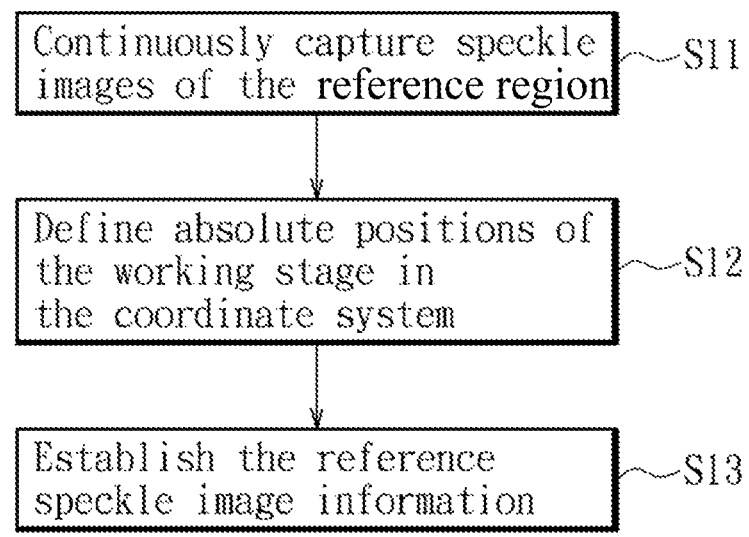
FIG. 4 is a flowchart illustrating steps of a reference establishing mode for establishing reference speckle image information of a reference region of the platform.

Referring to FIGS. 1, 2 and 4, in the reference establishing mode, the control module 14 is operable, in step S11, to control the motion driving module 11 to move the working stage 12 in a manner that the speckle image capturing module 13 is able to continuously capture speckle images of the reference region 21 at different positions defined in the coordinate system of the reference region 21 on the platform 20, while simultaneously, in step S12, being operable to cooperate with a precision positioning apparatus (e.g., a laser interferometer like Agilent 5530 Dynamic Calibrator) to define absolute positions of the working stage 12 in the coordinate system.

In step S13, the control module 14 is operable to establish the reference speckle image information consisting of the speckle images obtained in step S11, and to associate the speckle images of the reference speckle image information with the absolute positions in the coordinate system.

Figure 5:
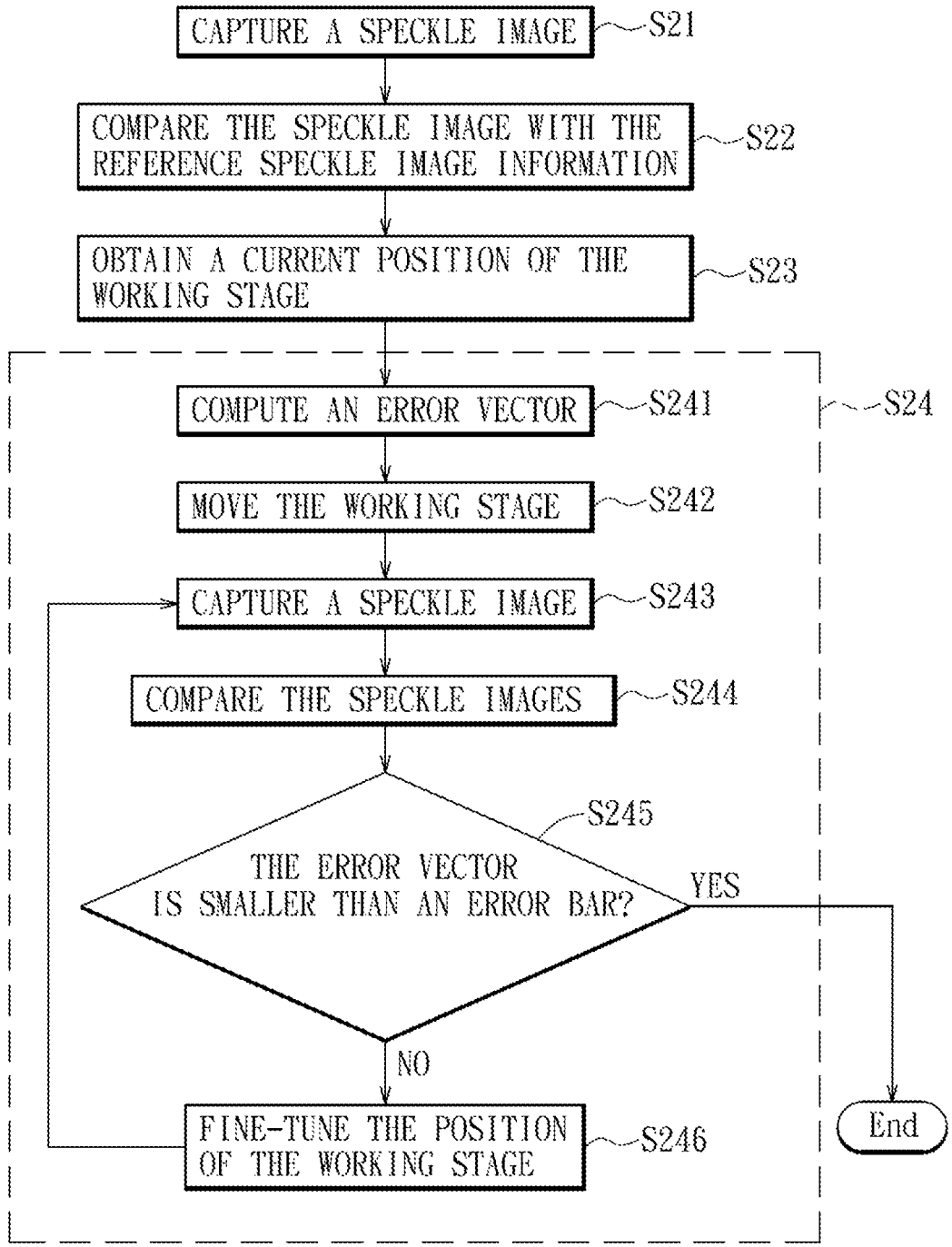
FIG. 5 is a flowchart illustrating steps of a positioning mode for positioning and actuating a working stage to move relative to the platform.

With reference to FIG. 5, in the positioning mode, the control module 14 is operable, in step S21, to control the speckle image capturing module 13 to capture a speckle image of a sub-region 22 of the reference region 21.

In step S22, the control module 14 is operable to compare the speckle image captured in step S21 with each of the speckle images of the reference speckle image information established in the reference establishing mode. Then, in step S23, the control module 14 is operable to obtain a current position of the working stage 12 in the coordinate system based on a result of the comparison in step S22. In particular, the control module 14 is operable to find one of the speckle images of the reference speckle image information that matches the speckle image captured in step S21, and to determine one of the absolute positions in the coordinate system that is associated with said one of the speckle images of the reference speckle image information as the current position of the working stage 12.

In step S24, the control module 14 is operable to control the motion driving module 11 to drive the working stage 12 toward a target position, which is one of the absolute positions in the coordinate system, based on a difference between the current position and the target position. In particular, the actuating system 1 is operable to implement sub-steps S241 to S244 to precisely move the working stage 12 to the target position in the coordinate system. In sub-step S241, the control module 14 is operable to compute an error vector between the target position and the current position of the working stage 12 determined in step S23. In sub-step S242, the control module 14 is operable to control the motor 111 of the motion driving module 11 to drive the working stage 12 to move along the guide unit 112 toward the target position according to the error vector obtained in sub-step S241. Then, in sub-step S243, the control module 14 is operable to control the speckle image capturing module 13 to capture a speckle image of another sub-region 22 of the reference region 21 corresponding to the current position. In sub-step S244, the control module 14 is operable to compare the speckle image captured in sub-step S243 with a corresponding one of the speckle images of the reference speckle image information that is associated with the target position, and to compute an error vector there between. In sub-step S245, the control module 13 is operable to determine whether the error vector computed in sub-step S244 is smaller than a predetermined error bar, i.e., the precision with which the motion driving module 11 drives the working stage 12 to move. Subsequently, when it is determined in sub-step S245 that the error vector computed in sub-step S244 is not smaller than the predetermined error bar, the control module 14 is operable in sub-step S246 to control the piezoelectric actuating unit 113 of the motion driving module 11 to fine-tune the position of the working stage 12 according to the error vector computed in sub-step S244, and to repeat sub-step S243. The positioning mode is completed when the determination made in sub-step S245 is affirmative, that is to say, the working stage 12 is placed precisely at the target position in the coordinate system at this time.

Figure 6:
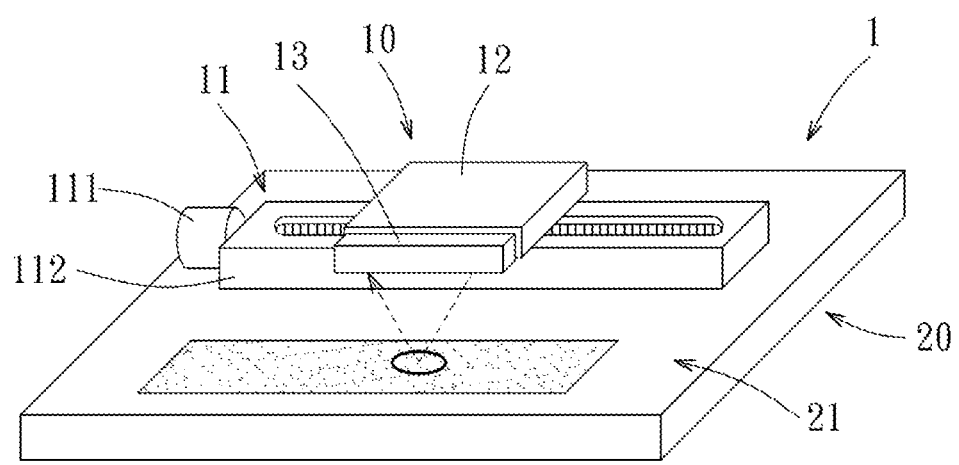
FIG. 6 is a perspective view of a second preferred embodiment of the actuating system according to the present invention.
Figure 7:
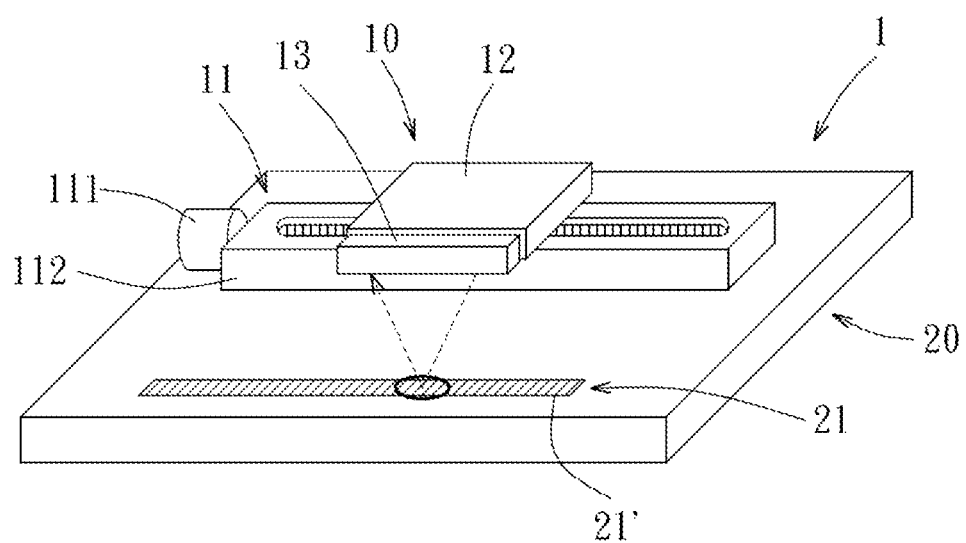
FIG. 7 is a perspective view illustrating an example in which the platform of the actuating system of the second preferred embodiment has the strip with speckle features attached thereon.

FIG. 6 shows the second preferred embodiment of the actuating system 1 according to the present invention. The actuating system 1 of this embodiment is similar to the first preferred embodiment. In this embodiment, the piezoelectric actuating unit 113 (see FIG. 1) of the motion driving module 11 is omitted and the working stage 12 is directly and movably mounted on the guide unit 112 of the motion driving module 11. The actuating system 1 of this embodiment is capable of positioning the working stage 12 with a precision of about 0.1 µm and is suitable for large—range applications. Similarly, in the case that the platform 20 made of metal operates outside a thermostatically controlled environment, a strip 21' having a relatively low thermal expansion coefficient and sufficient speckle features is attached to the top surface of the platform 20 to serve as the reference region 21 as shown in FIG. 7.

To sum up, since the reference region 21 of the platform 20 (or the strip 21' provided on the platform 20) has anti-abrasion and anti-deformation characteristics and a relatively low thermal expansion coefficient, and since the motion driving module 11 and the speckle image capturing module 13 are rigidly and respectively coupled to the platform 20 and the working stage 12, the speckle image of the sub-region 22 of the reference region 21 captured by the speckle image capturing module 13 is invariant, and a corresponding relationship between the sub-region 22 and the position of the working stage 12 relative to the platform 20 is invariant, such that the speckle image can be used to obtain the absolute position of the working stage 12 as defined in the coordinate system by comparing with the pre-established reference speckle image information. Further, the drawback of having cumulative errors during movement of the working stage 12 as with the prior art is eliminated since the present invention provides an actuating system 1 with absolute positioning defined in a coordinate system of its own, and does not rely on external positioning mechanisms that rely on relative positions. Accordingly, errors may be avoided even after the actuating system 1 of the present invention actuates the working stage 12 to move a large distance, and thus the actuating system 1 of the present invention is suitable for use in machining of products with large dimensions.

While the present invention has been described in connection with what are considered the most practical and preferred embodiments, it is understood that the present invention is not limited to the disclosed embodiments but is intended to cover various arrangements included within the spirit and scope of the broadest interpretation so as to encompass all such modifications and equivalent arrangements.

What is claimed is:

1. An actuating apparatus comprising:
   a motion driving module to be rigidly coupled to a platform having a reference region that has speckle features and that is associated with a coordinate system;
   a working stage coupled to and driven by said motion driving module to move relative to the platform;
   a speckle image capturing module rigidly coupled to said working stage so as to be movable relative to the platform along with said working stage, and capable of capturing a speckle image of a sub-region of the reference region; and
   a control module operatively associated with said motion driving module and said speckle image capturing module, and operable in a positioning mode, where said control module obtains a current position of said working stage in the coordinate system based on a comparison between the speckle image captured by said speckle image capturing module and reference speckle image information that is associated with and unique to the reference region of the platform, and controls said motion driving module to drive said working stage toward a target position in the coordinate system based on a difference between the current position of said working stage and the target position.

2. The actuating apparatus as claimed in claim 1, wherein said control module is further operable in a reference establishing mode, where said control module establishes the reference speckle image information and associates the reference speckle image information with the coordinate system by controlling said motion driving module to move said working stage in a manner that said speckle image capturing module is able to capture speckle images of the reference region at different positions in the coordinate system.

3. The actuating apparatus as claimed in claim 1, wherein said motion driving module includes a motor, and a guide unit that is to be rigidly coupled to the platform, that has said working stage disposed movably thereon, and that is operatively associated with said motor so as to drive said working stage to move relative to the platform.

4. The actuating apparatus as claimed in claim 3, wherein said motor is a linear motor, and said guide unit is a linear slide rail.

5. The actuating apparatus as claimed in claim 3, wherein said motor is one of a servo motor and a stepper motor, said guide unit including a ball screw shaft that is coupled to said working stage and that is driven by said one of said servo motor and said stepper motor so as to drive said working stage to move relative to the platform.

6. The actuating apparatus as claimed in claim 3, wherein said motion driving module further includes a piezoelectric actuating unit including a base that is mounted movably on said guide unit, and a piezoelectric element that is mounted on said base and that is operatively associated with said control module, said working stage being disposed on said base and being coupled to and driven by said piezoelectric element to move relative to said base.

7. The actuating apparatus as claimed in claim 3, wherein said piezoelectric actuating unit of said motion driving module includes a base that is mounted movably on said guide unit in a first direction, and a pair of piezoelectric elements that are mounted on said base and that are operatively associated with said control module, said working stage being disposed on said base and being coupled to and driven by said piezoelectric elements to move relative to said base, one of said piezoelectric elements being configured to drive said working stage to move in the first direction, the other one of said piezoelectric elements being configured to drive said working stage to move in a second direction perpendicular to the first direction.

8. The actuating apparatus as claimed in claim 1, wherein said speckle image capturing module and said control module are configured to communicate with each other over a wired or wireless connection.

9. An actuating system comprising:
   a platform having a reference region that has speckle features and that is associated with a coordinate system; and
   an actuating apparatus including
      a motion driving module rigidly coupled to said platform,
      a working stage coupled to and driven by said motion driving module to move relative to said platform,
      a speckle image capturing module rigidly coupled to said working stage so as to be movable relative to said platform along with said working stage, and capable of capturing a speckle image of a sub-region of said reference region, and
      a control module operatively associated with said motion driving module and said speckle image capturing module, and operable in a positioning mode, where said control module obtains a current position of said working stage in the coordinate system based on a comparison between the speckle image captured by said speckle image capturing module and reference speckle image information that is associated with and unique to said reference region of said platform, and controls said motion driving module to drive said working stage toward a target position in the coordinate system based on a difference between the current position of said working stage and the target position.

10. The actuating system as claimed in claim 9, wherein said control module of said actuating apparatus is further operable in a reference establishing mode, where said control module establishes the reference speckle image information and associates the reference speckle image information with the coordinate system by controlling said motion driving module to move said working stage in a manner that said speckle image capturing module is able to capture speckle images of the reference region at different positions in the coordinate system.

11. The actuating system as claimed in claim 9, wherein said motion driving module of said actuating apparatus includes a motor, and a guide unit that is rigidly coupled to said platform, that has said working stage disposed movably thereon, and that is operatively associated with said motor so as to drive said working stage to move relative to the platform.

12. The actuating system as claimed in claim 11, wherein said motor is a linear motor, and said guide unit is a linear slide rail.

13. The actuating system as claimed in claim 11, wherein said motor is one of a servo motor and a stepper motor, said guide unit including a ball screw shaft that is coupled to said working stage and that is driven by said one of said servo motor and said stepper motor so as to drive said working stage to move relative to the platform.

14. The actuating system as claimed in claim 11, wherein said motion driving module further includes a piezoelectric actuating unit and a base that is mounted movably on said guide unit, and a piezoelectric element that is mounted on said base and that is operatively associated with said control module, said working stage being disposed on said base and being coupled to and driven by said piezoelectric element to move relative to said base.

15. The actuating system as claimed in claim 11, wherein said piezoelectric actuating unit of said motion driving module includes a base that is mounted movably on said guide unit in a first direction, and a pair of piezoelectric elements that are mounted on said base and that are operatively associated with said control module, said working stage being disposed on said base and being coupled to and driven by said piezoelectric elements to move relative to said base, one of said piezoelectric elements being configured to drive said working stage to move in the first direction, the other one of said piezoelectric elements being configured to drive said working stage to move in a second direction perpendicular to the first direction.

16. The actuating system as claimed in claim 9, wherein said platform is made of an anti-abrasion and anti-deformation material.

17. The actuating system as claimed in claim 16, wherein said platform is made of a material selected from the group consisting of marble, metal, and combinations thereof.

18. The actuating system as claimed in claim 9, wherein said speckle image capturing module and said control module are configured to communicate with each other over a wired or wireless connection.

19. A method for actuating a working stage to move relative to a platform, the working stage being coupled to and driven by a motion driving module which is rigidly coupled to the platform, the platform having a reference region that has speckle features and that is associated with a coordinate system, said method comprising the steps of:
configuring a speckle image capturing module rigidly coupled to the working stage to capture a speckle image of a sub-region of the reference region;
comparing the speckle image thus captured with reference speckle image information that is associated with and unique to the reference region of the platform;
obtaining a current position of the working stage in the coordinate system based on a result of the comparison; and
controlling the motion driving module to drive the working stage toward a target position in the coordinate system based on a difference between the current position of the working stage and the target position.

20. The method as claimed in claim 19, further comprising the step of:
establishing the reference speckle image information and associating the reference speckle image information with the coordinate system by controlling the motion driving module to move the working stage in a manner that the speckle image capturing module is able to capture speckle images of the reference region at different positions in the coordinate system.

* * * * *